(12) United States Patent
Lee et al.

(10) Patent No.: US 9,674,762 B2
(45) Date of Patent: Jun. 6, 2017

(54) TRANSMISSION DEVICE, RECEPTION DEVICE FOR PROVIDING SIMULTANEOUS DATA TRANSMISSION SERVICE AND METHOD THEREOF

(71) Applicant: SK TELECOM CO., LTD., Seoul (KR)

(72) Inventors: Gyu Min Lee, Yongin-si (KR); Jeong Su Kim, Seongnam-si (KR); In Jang Jeong, Seoul (KR); Kyung Hoon Kim, Bucheon-si (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 14/095,449

(22) Filed: Dec. 3, 2013

(65) Prior Publication Data

US 2014/0092810 A1 Apr. 3, 2014

Related U.S. Application Data

(63) Continuation of application No. PCT/KR2012/004158, filed on May 25, 2012.

(30) Foreign Application Priority Data

| Jun. 3, 2011 | (KR) | 10-2011-0054096 |
| Jul. 15, 2011 | (KR) | 10-2011-0070625 |
| Aug. 16, 2011 | (KR) | 10-2011-0081113 |

(51) Int. Cl.
*H04W 40/02* (2009.01)
*H04W 76/02* (2009.01)
*H04W 48/18* (2009.01)

(52) U.S. Cl.
CPC ........... *H04W 40/02* (2013.01); *H04W 48/18* (2013.01); *H04W 76/026* (2013.01)

(58) Field of Classification Search
CPC .................. H04L 63/18; H04L 12/66
(Continued)

(56) References Cited

U.S. PATENT DOCUMENTS

| 2004/0193878 A1* | 9/2004 | Dillinger ........................ 713/165 |
| 2005/0213574 A1* | 9/2005 | Yoshimura et al. .......... 370/389 |

(Continued)

FOREIGN PATENT DOCUMENTS

| CN | 1910870 A | 2/2007 |
| CN | 1938962 A | 3/2007 |

(Continued)

OTHER PUBLICATIONS

International Search Report mailed Nov. 27, 2012 for PCT/KR2012/004158.

(Continued)

*Primary Examiner* — Siming Liu
(74) *Attorney, Agent, or Firm* — Hauptman Ham, LLP

(57) ABSTRACT

Disclosed are a transmission device, a reception device and a method for providing a simultaneous data transmission for a data session through a plurality of heterogeneous networks. The transmission device divides particular data to be transmitted into two or more partial data, transmits first partial data after inserting first tunneling information which induces the first partial data to pass through a first network of two or more networks into the first partial data, and transmits second partial data of the two or more partial data after inserting second tunneling information which induces the second partial data to pass through a second network of the two or more networks into the second partial data.

17 Claims, 6 Drawing Sheets

(58) Field of Classification Search
USPC .......... 370/351, 389; 730/150, 164–165
See application file for complete search history.

(56) References Cited

U.S. PATENT DOCUMENTS

2007/0002748 A1* 1/2007 Nakata .................. 370/238
2007/0204196 A1* 8/2007 Watson .................. 714/751

FOREIGN PATENT DOCUMENTS

| | | |
|---|---|---|
| CN | 101715209 A | 5/2010 |
| CN | 102457563 A | 5/2012 |
| JP | 2004289647 A | 10/2004 |
| KR | 1020050017674 A | 2/2005 |
| KR | 1020050073096 A | 7/2005 |
| KR | 1020060065427 A | 6/2006 |
| KR | 1020070008572 A | 1/2007 |
| KR | 1020070041096 A | 4/2007 |
| KR | 1020090080742 A | 7/2009 |

OTHER PUBLICATIONS

Korean Office Action dated Aug. 21, 2013 for application No. 10-2011-0070625.
Korean Office Action dated Jun. 20, 2012 for application No. 10-2011-0054096.
Korean Notice of Allowance for No. 10-2011-0054096 dated Jul. 26, 2013.
Korean Office Action for No. 10-2011-0054096 dated Jun. 20, 2012.
Korean Notice of Allowance for No. 10-2011-0070625 dated Nov. 20, 2012.
Korean Office Action for No. 10-2011-0070625 dated Aug. 21, 2013.
Korean Office Action for application No. 10-2011-0081113 dated Mar. 31, 2014.
Chinese Office Action dated Sep. 23, 2016 in connection with the counterpart Chinese Patent Application No. 201280009457.8.

* cited by examiner

TRANSMISSION DEVICE, RECEPTION DEVICE FOR PROVIDING SIMULTANEOUS DATA TRANSMISSION SERVICE AND METHOD THEREOF

CROSS-REFERENCE TO RELATED APPLICATION

The present application is a continuation of International Application No. PCT/KR2012/004158 filed on May 25, 2012, which is based on, and claims priorities from, KR Application Serial Number 10-2011-0054096, filed on Jun. 3, 2011, KR Application Serial Number 10-2011-0070625, filed on Jul. 15, 2011 and KR Application Serial Number 10-2011-0081113, filed on Aug. 16, 2011. The disclosures of the above-listed applications are hereby incorporated by reference herein in their entirety.

FIELD

The present disclosure relates to a system, device and a method for implementing simultaneously data transmission using a plurality of heterogeneous networks.

BACKGROUND

The statements in this section merely provide background information related to the present disclosure and may not constitute prior art.

Recently, a service provider simultaneously provides services based on a plurality of wireless technologies in many cases. A main domestic service provider has introduced WCDMA, CDMA, WiBro, and a WLAN (WiFi) technology corresponding to a wireless local area network to construct and service a network. Further, currently, a Long Term Evolution (LTE) network is actively introduced.

The inventor(s) have experienced that in a heterogeneous network environment where various networks coexist, a current method in which a terminal device uses a data service through the heterogeneous network may correspond to a passive method in that the method is an access network selection method by a direct change by a terminal device user which excludes a service provider's controllability when a service provider side is considered.

Meanwhile, at present, as various wireless devices such as a smart phone, a tablet PC and the like increase, a data service charge decreases, and various large-capacity data services increase, a network load rate of the service provider rapidly increases, and thus network investment costs are excessively spent and service stability is threatened.

Accordingly, the inventor(s) have noted that a new service method of actively selecting an access network of the terminal device according to a network status in the heterogeneous network environment where various networks coexist and efficiently transmitting data by using the selected network is required.

SUMMARY

In accordance with some embodiments, a transmission device for simultaneous data transmission comprises a multi communication unit and a controller. The multi communication unit is configured to communicate with two or more network interfaces for two or more networks in a heterogeneous network. And the controller is configured to divide particular data to be transmitted into two or more partial data, insert first tunneling information into first partial data of the divided two or more partial data, the first tunneling information indicating information to induce the first partial data to pass through a first network of the two or more networks, insert second tunneling information into second partial data of the two or more partial data, the second tunneling information indicating information to induce the second partial data to pass through a second network of the two or more networks, and provide the first partial data and the second partial data to the multi communication unit.

In accordance with some embodiments, a reception device for simultaneous data transmission comprises a multi communication unit and a controller. The multi communication unit is configured to communicate with two or more network interfaces for two or more networks in a heterogeneous network. And the controller is configured to receive through the multi communication unit first partial data corresponding to a part of two or more partial data through a first network of the two or more networks, the two or more partial data divided from particular data and transmitted from a transmission device, receive through the multi communication unit second partial data corresponding to another part of the two or more partial data through a second network of the two or more networks, remove first tunneling information included in the first partial data and second tunneling information included in the second partial data, and combine the first partial data and the second partial data after removing the first and second tunneling information to reconstruct the particular data.

In accordance with some embodiments, a transmission device for providing simultaneous data transmission service over two or more networks in a heterogeneous network, is configured to divide particular data to be transmitted into two or more partial data, to insert first tunneling information into first partial data of the two or more partial data and transmitting the first partial data over a first network of the two or more networks, the first tunneling information indicating information to induce the first partial data to pass through the first network, and to insert second tunneling information into second partial data of the two or more partial data and transmitting the second partial data over a second network of the two or more networks, the second tunneling information indicating information to induce the second partial data to pass through the second network.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

Hereinafter, at least one embodiment of the present disclosure will be described with reference to the accompanying drawings.

Figure 1:
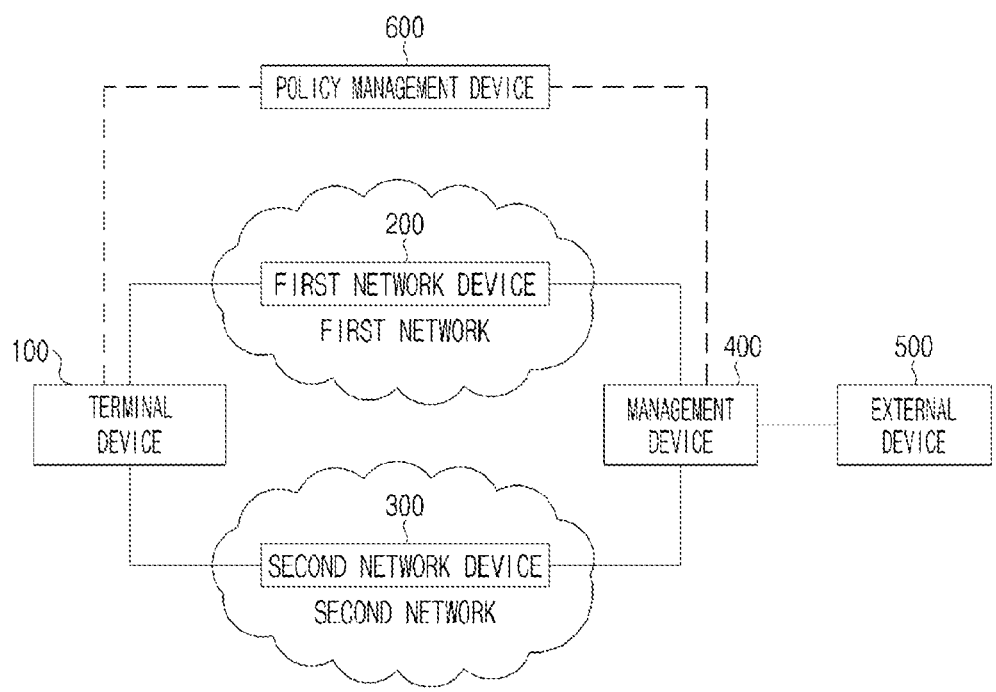
FIG. 1 is a schematic block diagram of a heterogeneous network-based simultaneous data transmission service system according to at least one embodiment of the present disclosure.

FIG. 1 is a schematic block diagram of a heterogeneous network-based simultaneous data transmission service system according to at least one embodiment of the present disclosure.

As illustrated in FIG. 1, a heterogeneous network-based simultaneous data transmission service system according to the present disclosure includes a transmission and reception device (i.e., hereinafter referred to as "terminal device") 100 configured to divide particular data to be transmitted into two or more partial data, insert particular network access information and first tunneling information which induces first partial data to pass through at least one corresponding network of two or more networks (for example, 3G, WiFi, LTE, and WiBro networks and the like) into the first partial data corresponding to a part of the two or more partial data, insert the network access information and second tunneling information which induces second partial data to pass through at least one corresponding network of the two or more networks into the second partial data corresponding to another part of the two or more partial data, and transmit the first and second partial data, a first network device 200 configured to receive the first partial data from the terminal device 100, a second network device 300 configured to receive the second partial data from the terminal device 100, and a management device 400 functioned as a reception device configured to receive the first partial data from the first network device 200 and receive the second partial data from the second network device 300, and combine the first partial data and the second partial data according to the particular network access information based on the network access information inserted into the received first partial data and second partial data to thereby reconstruct (or reconstitute or generate) the data. In some embodiments, e.g., in uplink process, the terminal device 100 is configured to function as a transmission device and the management device 400 is configured to function as reception device. In further embodiments, e.g., in a downlink process, the terminal device 100 is configured to function as a reception device and the management device 400 is configured to function as transmission device. That is, in view of these aspects the terminal device 100 can defined to be a transmission and reception device and includes both or either of a transmission device and a reception device which are configured to be independent each other.

Further, the heterogeneous network-based simultaneous data transmission service system according to the present disclosure includes an external device 500 configured to receive the combined data from the management device 400 and a policy management device 600 configured to provide a network selection policy.

Hereinafter, for the convenience of description, the transmission and reception device 100 is mentioned and described as the terminal device 100, and the transmission and reception device 100 and the terminal device 100 will be used together.

A heterogeneous network-based simultaneous data transmission service according to the present disclosure implements configurations of dividing data and transmitting and/or receiving the divided data by using a plurality of heterogeneous networks (for example, a 3G network and a WiFi network) in data transmission/reception between the terminal device 100 and the external device 500.

Accordingly, in the present disclosure, the management device 400 performs a session division to implement simultaneous link transmission through the plurality of heterogeneous networks for one session. At this time, since the terminal device 100 is connected to at least one of the plurality of heterogeneous networks (for example, the 3G network and the WiFi network), the management device 400 recognizes that each of the simultaneous links through the plurality of heterogeneous networks (for example, the 3G network and the WiFi network) corresponds to a link of one terminal device 100 and manages the terminal device 100 as one subject. To this end, it is required to allocate/manage separate network access information (for example, a virtual IP) for the simultaneous transmission service in accordance with the terminal device 100.

The external device 500 refers to a server device for performing data transmission/reception with the terminal device 100 through the management device 400, and can provide various services such as a portal service, a content providing service and the like to the terminal device 100 through the data transmission/reception by the management device 400.

Further, the policy management device 600 determines a network selection policy based on various network parameters on the heterogeneous network including, for example, a subscriber preference, a subscriber type, a subscription payment system, an application type to be serviced and the like, and network status information according to a network status change received from the terminal device 100 and the management device 400, and provides the determined network selection policy to the terminal device 100 and the management device 400.

Meanwhile, the heterogeneous network may correspond to various access networks including, for example, WCDMA, CDMA, WiBro, WLAN (WiFi), and Long Term Evolution (LTE), but in the at least one embodiment the heterogeneous network will be exemplarily described, but not limited thereto, as a first network (hereinafter, referred to as a "3G network") which refers to a wireless packet service network (WCDMA) and a second network (hereinafter, referred to as a "WiFi network) which refers to a wireless local area network.

Accordingly, the first network device 200 refers to Gateway GPRS Support Node (GGSN) equipment for operating the 3G network, that is, the wireless packet service network, and the second network device 300 refers to an Access Point (AP) for operating the WiFi network, that is, the wireless local area network.

Further, the terminal device 100 and the management device 400 can be a transmission and reception device or a reception device in view of a service flow, that is, a subject transmitting data by using the simultaneous data transmission service, that is, an uplink process and a downlink process.

First, in order to use the simultaneous data transmission service in a heterogeneous network environment, a process of acquiring access information between the terminal device 100 and the management device 400 is first performed.

In this connection, the terminal device 100 is allocated its own first network access information on the 3G network (for example, a 3G IP) and its own second network access information on the WiFi network (for example, a WiFi IP).

For example, the terminal device 100 can receive its own first network access information (for example, the 3G IP) from the first network device 200 according to a conventional access information allocation method by registering a position in the 3G network.

Further, the terminal device 100 can receive its own second network access information (for example, a WiFi IP) from the second network device 300 according to a conventional access information allocation method by accessing the WiFi network.

Thereafter, for a service registration process between the terminal device 100 and the management device 400, the terminal device 100 acquires access information (for example, a management device 3G IP) of the management device 400 for the access to the 3G network by which the terminal device 100 can access the management device 400 through the first network, that is, the 3G network, and acquires access information (for example, a management device WiFi IP) of the management device 400 for the access to the WiFi network by which the terminal device 100 can access the management device 400 through the second network, that is, the WiFi network.

At this time, acquiring or recognizing, by the terminal device 100, the access information (for example, the management 3G IP) of the management device 400 for the access to the 3G network and the access information (for example, the management WiFi IP) of the management device 400 for the access to the WiFi network can be performed through various procedures.

Further, when the process of acquiring the access information of the management device 400 is completed, the service registration process between the terminal device 100 and the management device 400 is performed.

In this connection, the terminal device 100 accesses the management device 400 through the respective networks based on the acquired access information for the access to the 3G network and access information for the access to the WiFi network to make a request for the service registration.

For example, the terminal device 100 accesses the management device 400 through the first network, that is, the 3G network based on the acquired access information (for example, the management 3G IP) of the management device 400 for the access to the 3G network and transmits a binding update message to make a request for registering the terminal device 100 itself. Then, the management device 400 performs the service registration of the terminal device 100 by identifying additional information contained in the service registration request, for example, device identification information (for example, IMSI), first network access information (for example, the 3G IP), network type information (for example, the 3G network) indicating a network type through which the binding update message is transmitted, and service classification information (initial, update, and remove) and transmits a binding update response message (binding update ack) to the terminal device 100, which corresponds to performance of the service registration process through the 3G network.

Further, the terminal device 100 accesses the management device 400 through the second network, that is, the WiFi network based on the acquired access information (for example, the management device WiFi IP) of the management device 400 and transmits a binding update message to make a request for registering the terminal device 100 itself. Then, the management device 400 performs the service registration of the terminal device 100 by identifying additional information contained in the service registration request, for example, device identification information (for example, IMSI), second network access information (for example, the WiFi IP), network type information (for example, the WiFi network) indicating a network type through which the binding update message is transmitted, and service classification information (initial, update, and remove) and transmits a binding update response message (binding update ack) to the terminal device 100, which corresponds to performance of the service registration process through the WiFi network.

At this time, the terminal device 100 is allocated and possesses separate network access information (for example, a virtual IP) for the heterogeneous network based-simultaneous data transmission service according to the present disclosure and the allocation may be managed by the management device 400.

Then, the terminal device 100 can receive the network access information (for example, the virtual IP) allocated by the management device 400 during the service registration process through the aforementioned 3G network or WiFi network and possesses the received network access information.

Of course, various methods in which the terminal device 100 generates or possesses the network access information by itself based on pre-possessed device identification information (for example, MDN, IMSI, IMEI and the like) or uses (or possesses) pre-allocated network access information (for example, the 3G IP or WiFi IP) as the network access information can be used as well as the method of allocating/receiving the network access information (for example, the virtual IP) by/from the management device 400.

Further, the management device 400 can manage, for example, table information for each subscriber which includes the first network and second network access information (for example, the 3G IG and WiFi IP) mapped based on the device identification information (for example, IMSI) of the terminal device service-registered for each subscriber, the network access information (for example, the virtual IP), the service classification information (initial, update, and remove) based on the additional information contained in the service registration request of the terminal device 100 received through each of the 3G network and the WiFi network.

Meanwhile, in addition to the table information for each subscriber, the management device 400 can manage a network selection policy for traffic distributions in the heterogeneous network environment, for example, a source IP, a source port, a destination IP, a destination port, protocol (UDP, TCP or the like) information, and a traffic distribution rate for each of the 3G network and WiFi network for traffic discrimination.

As described above, when all the processes for the service registration between the terminal device 100 and the management device 400 are completed, a first network interface through the 3G network and a second network interface through the WiFi network are connected between the terminal device 100 and the management device 400.

Further, for data transmission/reception between the terminal device 100 and the external device 500, a simultaneous transmission service through the heterogeneous network, that is, the 3G network and the WiFi network will be initiated.

First, an uplink process will be described. The terminal device 100 corresponding to the transmission/reception device according to the present disclosure is configured to divide the data to be transmitted into partial data to use the simultaneous data transmission service.

That is, the terminal device 100 is configured to divide the data to be transmitted into two or more partial data corresponding to the number of networks for the simultaneous data transmission using the heterogeneous network environment, that is, the 3G network and the WiFi network, and the division process may be performed according to the traffic distribution rate for each of the changed networks received from the management device 400 according to the network selection policy transmitted from the policy management device 600 or real time network status monitoring.

In other words, the terminal device 100 identifies a first transmission rate for data transmission to the first network device 200 and a second transmission rate for data transmission to the second network device 300 included in the network selection policy, selects first partial data to be transmitted to the first network device 200 from two or more partial data divided from particular data to be transmitted, and selects second partial data to be transmitted to the second network device 300 from the remaining partial data of the divide two or more partial data based on the identified transmission rates.

Accordingly, by performing the data division process based on the network selection policy and each of the traffic distribution rates changed in real time, the terminal device 100 can apply relative usage rates of the 3G network and the WiFi network, for example, 10% of the 3G network and 90% of the WiFi network, 90% of the 3G network and 10% of the WiFi network, 50% of the 3G network and 50% of the WiFi network, 0% of the 3G network and 100% of the WiFi network, and 100% of the 3G network and 0% of the WiFi network.

Further, the terminal device 100 is configured to insert particular network access information (for example, a virtual IP) and first tunneling information which induces first partial data to pass through at least one particular network (for example, the 3G network) among two or more networks (for example, 3G, WiFi, LTE, and WiBro networks and the like) into the first partial data of the two or more partial data, and insert the particular network access information (for example, the virtual IP) and second tunneling information which induces second partial data to pass through at least one particular network (for example, the WiFi network) among two or more networks (for example, 3G, WiFi, LTE, and WiBro networks and the like) into the second partial data of the two or more partial data.

Thereafter, the terminal device 100 is configured to transmit the first partial data to the first network device 200 located in the 3G network based on the first tunneling information included in the first partial data, and the first network device 200 is configured to transmit the first partial data to the management device 400 corresponding to the reception device.

Further, the terminal device 100 is configured to transmit the second partial data to the second network device 300 located in the WiFi network based on the second tunneling information included in the second partial data, and the second network device 300 is configured to transmit the second partial data to the management device 400 corresponding to the reception device.

As described above, the first partial data divided by the terminal device 100 is transmitted to the management device 400 via the 3G network, and the second partial data divided by the terminal device 100 is transmitted to the management device 400 via the WiFi network.

The management device 400 is configured to receive the first partial data from the first network device 200 and the second partial data from the second network device 300 and reconstruct (or generate) data by combining the first partial data and the second partial data according to particular network access information based on the network access information included in the received first partial data and second partial data to reconstruct the data to be transmitted, which the terminal device 100 desires to transmit.

That is, the management device 400 can reconstruct (or generate) the original data to be transmitted by recognizing the first partial data and the second partial data having the same network access information (for example, the virtual IP) based on the network access information (for example, the virtual IP) included in the received several partial data and mixing (or combining) the first partial data and the second partial data according to order information included in the corresponding partial data.

Meanwhile, the management device 400 identifies a destination address of the first tunneling information included in each of the received partial data and extracts partial data having access information matched with the access information allocated to itself for each of the two or more networks.

That is, the management device 400 stores access information allocated to itself in accordance with each of the two or more networks (for example, 3G and WiFi networks). When the management device 400 receives partial data transmitted through the two or more networks (for example, 3G and WiFi networks), the management device 400 can extract partial data having access information (for example, a 3G IP of the terminal device or a WiFi IP of the terminal device) matched with the access information allocated to itself for each of the two or more networks (for example, 3G and WiFi networks) by identifying the destination address of the tunneling information included in each of the received partial data.

Further, the management device 400 transmits the reconstructed data to be transmitted to the external device 500 by using access information of the external device corresponding to a final recipient recognized through at least one among the first partial data and the second partial data.

As described above, the first partial data and the second partial data divided by the terminal device 100 are combined by the management device 400 during the process in which the first partial data and the second partial data pass through the management device 400 via the heterogeneous network (the 3G and WiFi networks) and are reconstructed as the original data, and the reconstructed data is transferred to the external device 500 which is the final recipient.

Next, a downlink process will be described. The management device 400 is configured to divide data which is requested to be transmitted from the external device 500 to the terminal device 100 into partial data to use the simultaneous data transmission service.

That is, the management device 400 divides the data to be transmitted into two or more partial data corresponding to the number of networks for the simultaneous data transmission using the heterogeneous network environment, that is, the 3G network and the WiFi network, and the division process may be performed according to the traffic distribution rate for each of the changed networks according to the network selection policy transmitted from the policy management device 600 and the real time network status monitoring.

In other words, the management device 400 identifies a first transmission rate for data transmission to the first network device 200 and a second transmission rate for data transmission to the second network device 300 included in the network selection policy, selects first partial data to be transmitted to the first network device 200 from two or more partial data divided from particular data to be transmitted, and selects second partial data to be transmitted to the second network device 300 from the remaining partial data of the divided two or more partial data based on the identified transmission rates.

Accordingly, by performing the data division process based on the network selection policy and each of the traffic distribution rate changed in real time, the management device 400 can apply relative usage rates of the 3G network and the WiFi network, for example, 10% of the 3G network and 90% of the WiFi network, 90% of the 3G network and 10% of the WiFi network, 50% of the 3G network and 50% of the WiFi network, 0% of the 3G network and 100% of the WiFi network, and 100% of the 3G network and 0% of the WiFi network.

Further, the management device 400 identifies access information for each network corresponding to the terminal device 100 which is a final recipient of this time data transmission and network access information based on table information for each subscriber pre-managed by the management device 400. For example, the management device 400 can identify the first network access information and the second network access information (for example, the 3G IP and the WiFi IP) corresponding to the terminal device 100 and the network access information (for example, the virtual IP) based on the table information for each subscriber.

In addition, the management device 400 is configured to insert particular network access information (for example, the virtual IP) and first tunneling information which induces first partial data to pass through at least one particular network (for example, the 3G network) among two or more networks (for example, 3G, WiFi, LTE, and WiBro networks and the like) into the first partial data, and insert the particular network access information (for example, the virtual IP) and second tunneling information which induces second partial data to pass through at least one particular network (for example, the WiFi network) among two or more networks (for example, 3G, WiFi, LTE, and WiBro networks and the like) into the second partial data.

Thereafter, the management device 400 is configured to transmit the first partial data to the first network device 200 located in the 3G network based on the first tunneling information included in the first partial data, and the first network device 200 transmits the first partial data to the terminal device 100 which is the reception device.

Further, the management device 400 is configured to transmit the second partial data to the second network device 300 located in the WiFi network based on the second tunneling information included in the second partial data, and the second network device 300 transmits the second partial data to the terminal device 100 which is the reception device.

As described above, the data transmitted from the external device 500 is divided during the process where the data passes through the management device 400, and the first partial data divided by the management device 400 is transmitted to the terminal device 100 via the 3G network and the second data divided by the management device 400 is transmitted to the terminal device 100 via the WiFi network.

The terminal device 100 is configured to receive the first partial data from the first network device 200 and the second partial data from the second network device 300, and reconstruct the data to be transmitted, which the management device 400 desires to transmit, by combining the first partial data and the second partial data according to particular network access information based on the network access information included in the received first partial data and second partial data to thereby reconstruct (or generate) the data.

That is, the terminal device 100 can reconstruct (or generate) the original data to be transmitted by recognizing the first partial data and the second partial data having pre-allocated network access information (for example, the virtual IP) based on the network access information (for example, the virtual IP) included in the received several partial data, recognizing the first partial data and the second partial data from the same external device 500 by identifying access information corresponding to an initial originator, that is, access information of the external device 500, and mixing/combining the first partial data and the second partial data according to the order information included in the corresponding partial data.

Meanwhile, the terminal device 100 can extract partial data having access information matched with the access information allocated to itself for each of the two or more networks by identifying a source address or a destination address of the tunneling information included in each of the received partial data.

That is, the terminal device 100 stores the access information allocated to itself in accordance with each of the two or more networks (for example, the 3G and WiFi networks). That is, when the terminal device 100 receives partial data transmitted through the two or more networks (for example, 3G and WiFi networks), the terminal device 100 can extract partial data having access information (for example, a 3G IP of the terminal device or a WiFi IP of the terminal device) matched with the access information allocated to itself for each of the two or more networks (for example, 3G and WiFi networks) by identifying the source address or the destination address of the tunneling information included in each of the received partial data.

Specifically, when the first tunneling information (i.e., at least one of source address information and destination address information) included in the partial data (i.e., the first partial data) received through the 3G network is matched with the second tunneling information (i.e., at least one of source address information and destination address information) included in the partial data (i.e., the second partial data) received through the WiFi network, the terminal device 100 can reconstruct (or generate) the original data to be transmitted by combining both partial data.

As described above, the first partial data and the second partial data divided by the management device 400 is transmitted to the terminal device 100 through the heterogeneous network (3G and WiFi networks), combined in the terminal device 100, and then reconstructed as the original data to be transmitted.

Figure 2:
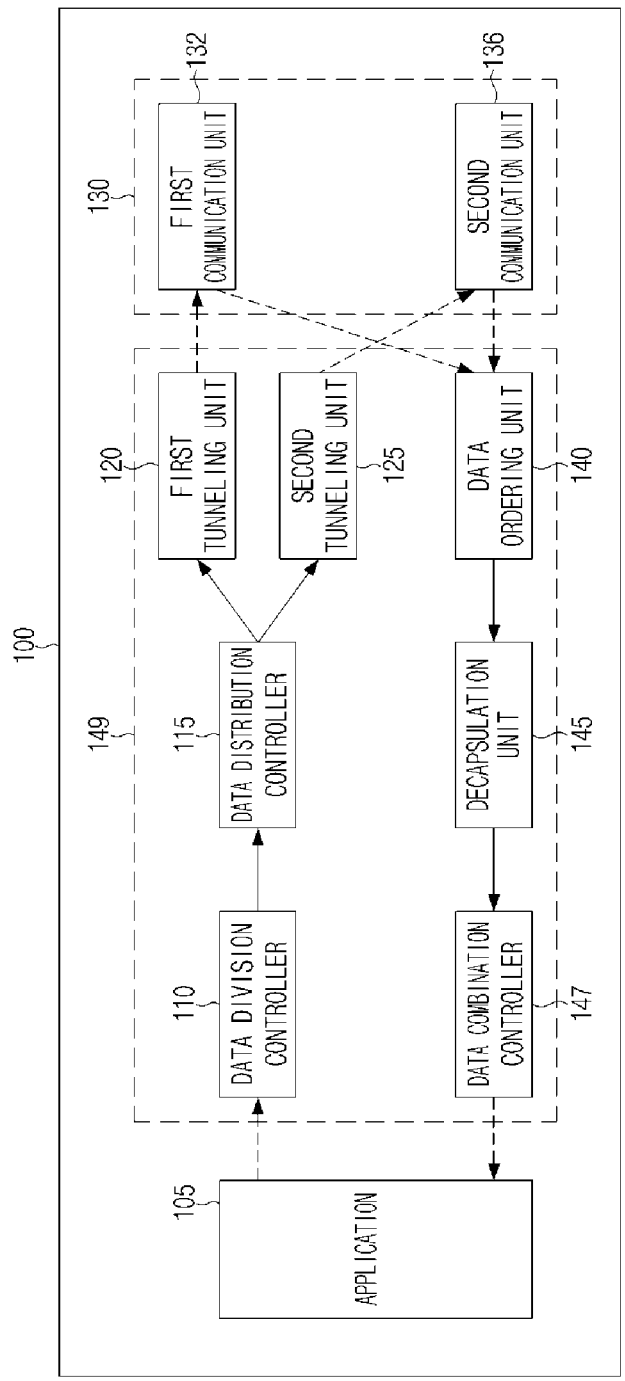
FIG. 2 is a schematic block diagram of a configuration of a transmission and reception device according to at least one embodiment of the present disclosure.

Hereinafter, a configuration of the transmission and reception device according to the present disclosure, that is, the terminal device 100 corresponding to the terminal device 100 will be described with reference to FIG. 2 in more detail.

The transmission device 100 according to the present disclosure includes a multi communication unit 130 configured to communicate with (or support) two or more network interfaces through two or more networks, and a controller 149 configured to divide particular data to be transmitted into two or more partial data, insert particular network access information and first tunneling information which induces first partial data to pass through at least one corresponding network of two or more networks (for example, 3G, WiFi, LTE, WiBro and the like) into first partial data corresponding to a part of the two or more partial data, insert the network access information and second tunneling information which induces second partial data to pass through at least one corresponding network of the two or more networks into second partial data corresponding to the other part of the two or more partial data, and provide the first and second partial data to the multi communication unit 130.

The multi communication unit 130 corresponds to a communication function unit configured to communicate with two or more network interfaces through two or more difference networks (for example, 3G, WiFi, LTE, WiBro and the like). Two networks will be mentioned and described as an example. The multi communication unit 130 may include a first communication unit 132 configured to communicate with a first network and a second communication unit 136 configured to communicate with a second network.

Here, the first communication unit 132 is a communication module configured to transmit/receive data by communicating with a first network interface through the first network, for example, a communication module configured to interwork with the first network device 200 by using the 3G network.

The second communication unit 136 is a communication module configured to transmit/receive data by communicating with a second network interface through the second network, for example, a communication module configured to interwork with the second network device 300 by using the WiFi network.

The controller 149 may have a type of being mounted in an OS kernel installed in the terminal device 100, and be embedded in the terminal device 100 or downloaded to the terminal device 100 to perform a series of operations for the simultaneous data transmission service according to a request of an installed particular application.

More specifically, the controller 149 can receive a request for transmission by receiving particular data which is to be transmitted, from a particular application 105 using a data service executed within the terminal device 100.

Then, the controller 149 is configured to divide particular data to be transmitted into two or more partial data, insert particular network access information and first tunneling information which induces first partial data to pass through at least one corresponding network of two or more networks (for example, 3G, WiFi, LTE, WiBro and the like) into first partial data corresponding to a part of the two or more partial data, insert the network access information and second tunneling information which induces second partial data to pass through at least one corresponding network of the two or more networks into second partial data corresponding to the other part of the two or more partial data, and provide the first and second partial data to the multi communication unit 130.

The controller 149 will be described in more detail. The controller 149 may include a data division controller 110 configured to divide particular data to be transmitted into two or more partial data and insert the network access information into the two or more partial data, a data distribution controller 115 configured to distribute the two or more partial data to the first partial data to be transmitted to a particular network among the two or more networks and the second partial data to be transmitted to another partial network among the two or more networks, a first tunneling unit 120 configured to insert first tunneling information which induces first partial data to pass through the particular network among the two or more networks into the first partial data, and a second tunneling unit 125 configured to insert second tunneling information which induces second partial data to pass through another particular network among the two or more networks into the second partial data.

The data division controller 110 is configured to divide the particular data to be transmitted into two or more partial data and insert the network access information into the two or more partial data.

Prior to the dividing and inserting, the controller 149 performs a service registration by acquiring access information (for example, a 3G IP of the management device and a WiFi IP of the management device) for the access to the 3G network and the WiFi network of the management device 400 which is the reception device to use the simultaneous data transmission service.

At this time, the controller 149 can be allocated and possess separate network information (for example, a virtual IP) for the heterogeneous network based-simultaneous data transmission service according to the present disclosure.

For example, the controller 149 can make a request for the service registration to the management device 400 through at least one of the first network and the second network, and receive allocation and possess the network access information (for example, the virtual IP) during the process of performing the service registration through a transmitted response to the request.

That is, the controller 149 can transmit a binding update message of making a request for the service registration to the management device 400 through the 3G network or the WiFi network, and acquire or recognize the network access information (for example, the virtual IP) included in a binding update response message during a service registration process in which the binding update response message is received in response to the request to possess the acquired or recognized network access information. In this case, since the management device 400 allocates the network access information (for example, the virtual IP), the management device 400 can perform the management while reflecting the allocated network access information (for example, the virtual IP) at this time to table information for each subscriber.

Meanwhile, in addition to the method of allocating/receiving the network access information by/from the management device 400, the controller 149 may generate the network access information by itself based on device identification information (for example, MDN, IMSI, IMEI and the like) pre-possessed according to a pre-defined particular access information generating policy to possess the generated network access information, or possess one of the pre-allocated first network access information (for example, the 3G IP) and second network access information (for example, the WiFi IP) as the network access information. In this case, the controller 149 provides its own network access information (for example, the virtual IP) to the management device 400, so that the management device 400 can perform the management while reflecting this time network access information (for example, the virtual IP) to table information for each subscriber as described above.

When the data division controller 110 receives particular data, which is to be transmitted, from the internal application 105 to receive a request for transmission, the data division controller 110 divides the corresponding particular data into two or more partial data and inserts the possessed network access information (for example, the virtual IP) into the two or more partial data as described above.

More specifically, for example, the data division controller 110 divides the data to be transmitted into two or more partial data corresponding to the number of networks to simultaneously transmit the data by using the 3G network and the WiFi network, and the division process may be performed according to a traffic distribution rate for each of the changed networks received from the management device 400 according to a network selection policy transmitted from the policy management device 600 and real time network status monitoring.

Further, the data division controller 110 can insert the network access information (for example, the virtual IP) for identifying that the first partial data and the second partial data are the partial data divided from one data provided from the particular transmission/reception device, that is, the transmission/reception device 100 including the data division controller 110 as source address information, and insert a header including access information of the particular external device 500 corresponding to a final recipient receiving the particular data as destination address information into the two or more divided partial data.

The data distribution controller 115 is configured to distribute the two or more partial data processed by the data division controller 110 to the first partial data to be transmitted to a particular network among two or more networks (for example, 3G, WiFi, LTE, WiBro and the like) and the second partial data to be transmitted to another particular network among the two or more networks.

That is, the data distribution controller 115 is configured to distribute the two or more partial data processed by the data division controller 110 in accordance with at least one particular network (for example, the 3G network or the WiFi network) to be used for the simultaneous transmission service.

For example, the data distribution controller 115 identifies a first transmission rate for data transmission to the first network device 200 and a second transmission rate for data transmission to the second network device 300 included in the network selection policy, selects the first partial data to be transmitted to the first network device 200 from the two or more partial data processed for the simultaneous data transmission using the 3G network and the WiFi network by the data division controller 110, and selects the second partial data to be transmitted to the second network device 300 from the remaining partial data based on the identified transmission rates to distribute the partial data to be transmitted for each network.

Accordingly, by performing the data division/distribution process based on the network selection policy and each of the traffic distribution rates changed in real time, the data distribution controller 115 can apply relative usage rates of the 3G network and the WiFi network, for example, 10% of the 3G network and 90% of the WiFi network, 90% of the 3G network and 10% of the WiFi network, 50% of the 3G network and 50% of the WiFi network, 0% of the 3G network and 100% of the WiFi network, and 100% of the 3G network and 0% of the WiFi network.

Thereafter, the data distribution controller 115 provides the distributed first partial data to the first tunneling unit 120 for supporting tunneling corresponding to the corresponding network interface and provides the distributed second partial data to the second tunneling unit 125 for supporting tunneling corresponding to the corresponding network interface.

The first tunneling unit 120 is configured to insert first tunneling information which indicates information to induce first partial data to pass through the particular network (for example, the 3G network) among the two or more networks into the first partial data provided by the data distribution controller 115.

That is, the first tunneling unit 120 inserts the first tunneling information which has pre-allocated first network access information as tunneling source address information in accordance with a particular first network to be passed through among the two or more networks and has access information of a particular management device configured to receive the first partial data transmitted via the particular first network device located in the first network as tunneling destination address information into the first partial data corresponding to a part of the two or more partial data.

For example, the first tunneling unit 120 may perform encapsulation which inserts the first tunneling information having pre-allocated first network access information (for example, a 3G IP of the transmission and reception device 100) as tunneling source address information in accordance with the particular first network (for example, the 3G network) to be passed through among the two or more networks and having access information (for example, a 3G IP of the management device) of the particular management device 400 configured to receive the first partial data transmitted via the particular first network device 200 located in the first network (for example, the 3G network) as tunneling destination address information into the first partial data provided by the data distribution controller 115 as a tunneling header.

The second tunneling unit 125 is configured to insert second tunneling information which induces second partial data to pass through the particular network (for example, the WiFi network) among the two or more networks into the second partial data provided by the data distribution controller 115.

That is, the second tunneling unit 125 inserts the second tunneling information which has pre-allocated second network access information as tunneling source address information in accordance with a particular second network to be passed through among the two or more networks and has access information of a particular management device configured to receive the second partial data transmitted via the particular second network device located in the second network as tunneling destination address information into the first partial data corresponding to a part of the two or more partial data.

For example, the second tunneling unit 125 may perform encapsulation which inserts the second tunneling information having pre-allocated second network access information (for example, a WiFi IP of the transmission/reception device 100) as tunneling source address information in accordance with the particular second network (for example, the WiFi network) to be passed through among the two or more networks and having access information (for example, a WiFi IP of the management device) of the particular management device 400 configured to receive the second partial data transmitted via the particular second network device 300 located in the second network (for example, the WiFi network) as tunneling destination address information into the second partial data provided by the data distribution controller 115 as a tunneling header.

The network access information for identifying that the first partial data and the second partial data are the partial data divided from one data provided by the particular transmission/reception device, that is, the terminal device 100 is carried on the first partial data and the second partial data, and also the tunneling information which allows data to arrive or be transmitted to the management device 400 via the particular network is carried on the first partial data and the second partial data.

Further, the first tunneling unit 120 provides the first partial data including the first tunneling information to the corresponding first communication unit 132, and the second tunneling unit 125 provides the second partial data including the second tunneling information to the corresponding second communication unit 136.

The first communication unit 132 is configured to transmit the first partial data to the first network device 200 by using the 3G network based on the first tunneling information included in the first partial data, and the second communication unit 136 is configured to transmit the second partial data to the second network device 300 by using the WiFi network based on the second tunneling information included in the second partial data.

Meanwhile, as described above, the first tunneling unit 120 which is the subject for adding or inserting the first tunneling information into the first partial data and the second partial data as the tunneling header may be combined with the corresponding first communication unit 132 to become one component, and the second tunneling unit 236 may be combined with the corresponding second communication unit 136 to become one component.

Meanwhile, the terminal device 100 according to the present disclosure can reconstruct (or generate) the original data to be transmitted by receiving and combining the partial data according to the simultaneous transmission service.

That is, when the controller 149 receives the first partial data corresponding to a part of the two or more partial data divided from one particular data and the second partial data corresponding to another part of the two or more partial data through the multi communication unit 130, the controller 149 is configured to remove the tunneling information included in the received first partial data and second partial data, and combine the first partial data and the second partial data according to particular network access information based on the network access information included in the first partial data and the second partial data to reconstruct (or generate) the data.

More specifically, the controller 149 may include a data ordering unit 140 configured to reorder the first partial data and the second partial data according to a reception order based on order information included in each partial data, a decapsulation unit 145 configured to remove the tunneling information included in the reordered first partial data and second partial data, and a data combination controller 147 configured to combine the first partial data and the second partial data according to particular network access information based on the network access information included in the first partial data and second partial data where the tunneling information is removed based on the order information.

The data ordering unit 140 is configured to receive the first partial data and the second partial data received through the first communication unit 132 and the second communication unit 136 in an arrangement form according to the reception order, and reorder the first partial data and the second partial data based on the order information included in each partial data.

That is, by the transmission through paths according to the access information included in the tunneling header of the first partial data and the second partial data, the data ordering unit 140 receives the first partial data transmitted via the first network device 200 located in the 3G network through the first communication unit 132 and receives the second partial data transmitted via the second network device 300 located in the WiFi network through the second communication unit 136.

The decapsulation unit 145 is configured to remove the tunneling information included in the first partial data and second partial data reordered by the data ordering unit 140.

That is, the decapsulation unit 145 can remove the tunneling information including the tunneling source address information having the network access information of the management device corresponding to a transmission side in accordance with the particular network of the two or more networks through which the corresponding partial data passes and the tunneling destination address information having the access information of the transmission/caption device configured to receive at least one of the first partial data and the second partial data transmitted via the particular network.

For example, in a case of the first partial data among the first partial data and second partial data reordered by the data ordering unit 140, the decapsulation unit 145 performs decapsulation which removes the tunneling header including the tunneling source address information having the network access information (for example, the 3G IP of the management device 400) corresponding to the transmission side in accordance with the particular network (for example, the 3G network) through which the first partial data passes and the tunneling destination address information having the access information (for example, the 3G IP of the transmission/reception device 400) of the transmission/reception device 400 configured to receive the first partial data transmitted via the particular network (for example, the 3G network). Further, in a case of the second partial data among the first partial data and second partial data reordered by the data ordering unit 140, the decapsulation unit 145 performs decapsulation which removes the tunneling header including the tunneling source address information having the network access information (for example, the WiFi IP of the management device 400) corresponding to the transmission side in accordance with the particular network (for example, the WiFi network) through which the second partial data passes and the tunneling destination address information having the access information (for example, the WiFi IP of the transmission/reception device 400) for receiving the second partial data transmitted via the particular network (for example, the WiFi network).

The decapsulation unit 145 can remove the tunneling header inserted into each of the first partial data and second partial data reordered by the data ordering unit 140.

The data combination controller 147 is configured to reconstruct the original data by combining the first partial data and the second partial data according to the particular network access information based on the network information (for example, the virtual IP) included in the first partial data and second partial data where the tunneling information is removed by the decapsulation unit 145 based on the order information.

More specifically, the data combination controller 147 can combine the corresponding first partial data and second partial data divided from one data provided by one external device based on the order information included in each partial data, based on at least one access information of the network access information for identifying that the first partial data and second partial data are the partial data which are divided from one data included in the destination address information of the first partial data and second partial data where the tunneling information is removed and then transmitted to the transmission/reception device corresponding to the final recipient and the access information of the external device indicating that the first partial data and the second partial data are the data transmitted and provided from the particular external device included in the source address information of the first partial data and the second partial data.

That is, the data combination controller 147 is configured to identify the network access information (for example, the virtual IP) included in the destination address information from the headers of the first partial data and second partial data where the tunneling information is removed by the decapsulation unit 145, and extract the first partial data and the second partial data having the particular network access information (for example, the virtual IP) used by the transmission/reception device 100 including itself, that is, the data division controller 110. It means that the first partial data and the second partial data are the partial data divided from one data provided to the transmission/reception device 100.

Further, the data combination controller 147 is configured to identify the network access information included in the source address information from the headers of the first partial data and second partial data having the extracted particular network access information (for example, the virtual IP), and extract the first partial data and the second partial data having the access information of the same particular external device 500 indicating that the first partial data and the second partial data are the data provided and transmitted from the particular external device 500. It means that the first partial data and the second partial data are the data provided from one external device 500.

Accordingly, the data combination controller 147 can reconstruct (or generate) the original data provided from the external device 500 corresponding to the initial originator by extracting/recognizing the corresponding first partial data and second partial data divided from one data provided from one external device 500 based on the destination address information and the source address information of the first partial data and second partial data where the tunneling information is removed by the decapsulation unit 145 and mixing/combining the first partial data and the second partial data according to the order information included in each partial data.

The data combination controller 147 can transmit the reconstructed (or generate) data to the corresponding application 105 using the data service through the current simultaneous transmission service.

Figure 3:
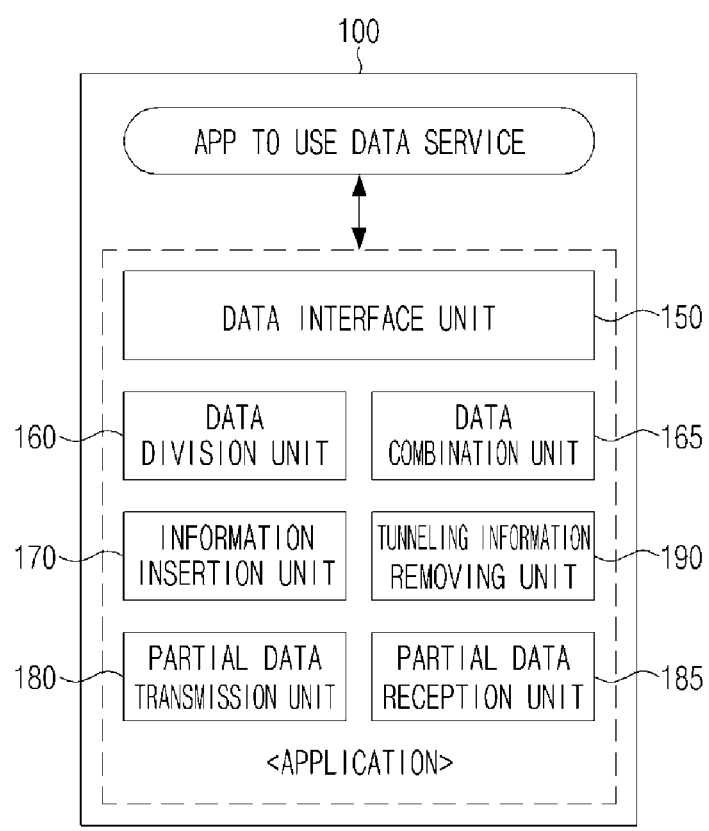
FIG. 3 is a schematic block diagram of a configuration of a transmission and reception device operating based on an application according to at least one embodiment of the present disclosure.

Hereinafter, the transmission/reception device 100 operating based on an application according to at least another embodiment of the present disclosure will be described with reference to FIG. 3 in more detail.

The transmission/reception device 100 according to the present disclosure includes a data interface unit 150 configured to receive particular data to be transmitted, a data division unit 160 for dividing the data into two or more partial data, an information insertion unit 170 configured to insert particular network access information into the two or more partial data, and a partial data transmission unit 180 configured to provide first partial data corresponding to a part of the two or more partial data and second partial data corresponding to another part of the two or more partial data including the network access information to insert first tunneling information which induces first partial data to pass through at least one corresponding network among two or more networks into the first partial data and insert second tunneling information which induces second partial data to pass through at least one corresponding network among the two or more networks into the second partial data.

The data interface unit 150 is configured to receive particular data to be transmitted.

For example, the data interface unit 150 can receive the particular data, which is to be transmitted, from a particular application using a data service executed within the transmission/reception device 100.

Here, it is preferable that when the data interface unit 150 possesses pre-allocated network access information (for example, a virtual IP), the data interface unit 150 transmits received data to be transmitted to the data division unit 160.

To this end, the transmission/reception device 100 according to the present disclosure may include a service registration controller (not shown) configured to make a request for a service registration to the particular management device 400 through at least one corresponding network among two or more networks and acquire network access information recognized through a transmitted response in response to the request.

As described above, the service registration controller (not shown) can transmit a binding update message of making a request for the service registration to the management device 400 through the 3G network or the WiFi network, acquire/recognize network access information (for example, the virtual IP) included in a binding update response message during a service registration process in which the binding update response message is received in response to the binding update message, and possess the acquired/recognized network access information.

The data division unit 160 is configured to divide one data to be transmitted into two or more partial data.

More specifically, the data division unit 160 is configured to divide the data to be transmitted into two or more partial data corresponding to the number of networks in order to simultaneously transmit the data by using the 3G network and the WiFi network, and the division process can be performed according to a traffic distribution rate for each of the changed networks received from the management device 400 according to a network selection policy transmitted from the policy management device 600 or real time network status monitoring.

Further, the data division unit 160 can identify a first transmission rate for data transmission to the first network device 200 and a second transmission rate for data transmission to the second network device 300 included in the network selection policy, select first partial data to be transmitted to the first network device 200 from two or more divided partial data, and select second partial data to be transmitted to the second network device 300 from the remaining partial data based on the identified transmission rates.

Accordingly, by performing the data division process based on the network selection policy and each of the traffic distribution rates changed in real time, the data division unit 160 can apply relative usage rates of the 3G network and the WiFi network, for example, 10% of the 3G network and 90% of the WiFi network, 90% of the 3G network and 10% of the WiFi network, 50% of the 3G network and 50% of the WiFi network, 0% of the 3G network and 100% of the WiFi network, and 100% of the 3G network and 0% of the WiFi network.

The information insertion unit 170 is configured to insert particular network access information into two or more partial data.

That is, as described above, the transmission/reception device 100 according to the present disclosure is configured to receive allocation and possess separate network access information (for example, the virtual IP) for the heterogeneous network based-simultaneous data transmission service.

The information insertion unit 170 can insert pre-possessed network access information (for example, the virtual IP) into each of the two or more divided partial data divided by the data division unit 160.

The information insertion unit 170 can insert a header including the network access information (for example, the virtual IP) for identifying that the first partial data and the second partial data are the partial data divided from one data provided from the particular transmission/reception device, that is, transmission/reception device 100 including the information insertion unit 170 as source address information and including access information of the particular external device 500 corresponding to a final recipient receiving the particular data as destination address information into the two or more partial data including the first partial data and the second partial data.

The partial data transmission unit 180 is configured to provide the first partial data corresponding to a part of the two or more partial data and the second partial data corresponding to another part of the two or more partial data including the network access information, and allow the tunneling information to be inserted into the first partial data and the second partial data and then the first partial data, and the second partial data are transmitted.

More specifically, the partial data transmission unit 180 is configured to allow the corresponding tunneling information to be inserted into the first partial data by providing the first partial data, into which the header including the network access information (for example, the virtual IP) and the access information of the particular external device 500 corresponding to the final recipient is inserted, to the corresponding communication module (for example, the first communication unit 132 of FIG. 2) for the pre-corresponded first network (for example, the 3G network).

The first tunneling information included in the first partial data may include first network access information (for example, a 3G IP) pre-allocated to the transmission/reception device 100 in accordance with the particular first network (for example, the 3G network) which is desired to be passed through among two or more networks (for example, 3G, WiFi, LTE, and WiBro networks) as tunneling source address information and access information (for example, a 3G IP of the management device 400) of the particular management device 400 configured to receive the first partial data transmitted via the particular first network device 200 located in the first network (for example, the 3G network) as tunneling destination address information. At this time, the first tunneling information included in the first partial data is inserted/capsulated into the first partial data as a tunneling header.

Further, the partial data transmission unit 180 is configured to allow the second tunneling information to be inserted into the second partial data by providing the second partial data, into which the header including the network access information (for example, the virtual IP) and the access information of the particular external device 500 corresponding to the final recipient is inserted, to the corresponding communication module (for example, the second communication unit 136 of FIG. 2) for the pre-corresponded second network (for example, the WiFi network).

The second tunneling information included in the second partial data may include second network access information (for example, a WiFi IP) pre-allocated to the transmission/reception device 100 in accordance with the particular second network (for example, the WiFi network) which is desired to be passed through among two or more networks (for example, 3G, WiFi, LTE, and WiBro networks) as tunneling source address information and access information (for example, a WiFi IP of the management device 400) of the particular management device 400 configured to receive the second partial data transmitted via the particular second network device 300 located in the second network (for example, the WiFi network) as tunneling destination address information. At this time, it is preferable that the second tunneling information included in the second partial data is inserted/capsulated into the second partial data as a tunneling header.

Meanwhile, the aforementioned method in which the first communication unit 132 and the second communication unit 136 insert the tunneling information into the first partial data and the second partial data is an embodiment, but the partial data transmission unit 180 can perform the process of inserting the tunneling information into the first partial data and the second partial data to transmit the first partial data to the first communication unit 130 and the second partial data to the second communication unit 136.

The network access information for identifying that the first partial data and the second partial data are the partial data divided from one data provided by the particular transmission/reception device, that is, the transmission/reception device 100 is carried on the first partial data and the second partial data transmitted from the transmission/reception device 100 through the heterogeneous network interfaces, and also the tunneling information which allows data to arrive or be transmitted to the management device 400 via the particular network is carried on the first partial data and the second partial data.

The first partial data is transmitted to the management device 400 via the first network device 200 by using the 3G network based on the first tunneling information included in the first partial data, and the second partial data is transmitted to the management device 400 via the second network device 300 by using the WiFi network based on the second tunneling information included in the second partial data.

Meanwhile, as described above, the operation of adding or inserting the tunneling information into the first partial data and the second partial data as the tunneling header may be performed by the information insertion unit 170 or the partial data transmission unit 180. In this case, the first partial data and the second partial data provided by the partial data transmission unit 180 are transmitted to the corresponding networks through the corresponding communication modules (for example, the first and second communication units 120 and 130 of FIG. 2) without the tunneling information inserting process.

Meanwhile, the transmission/reception device 100 according to the present disclosure can reconstruct (or generate) the original data to be transmitted, by receiving and combining the partial data according to the simultaneous transmission service.

That is, the transmission/reception device 100 may further include a partial data reception unit 185 configured to receive the first partial data corresponding to a part of the two or more partial data divided from one particular data and the second partial data corresponding to another part of the two or more partial data, a tunneling information removing unit 190 configured to remove the tunneling information included in the received first partial data and second partial data, and a data combination unit 165 configured to combine the first partial data and the second partial data according to particular network access information based on the network access information included in the first partial data and the second partial data to reconstruct (or generate) the data.

The partial data reception unit 185 is configured to receive the first partial data corresponding to a part of the two or more partial data divided from one particular data and the second partial data corresponding to another part of the two or more partial data.

That is, the partial data reception unit 185 receives the first data transmitted via the first network device 200 located in the 3G network through a transmission path according to access information included in the tunneling headers of the first partial data and the second partial data, and receives the second partial data transmitted via the second network device 300 located in the WiFi network.

the partial data receiver 185 receives the first partial data and the second partial data according to a reception order as reordered first partial data and second partial data based on order information included in each partial data.

The tunneling information removing unit 190 is configured to remove the tunneling information included in the received first partial data and second partial data.

The tunneling information removing unit 190 removes, from the received first partial data and second partial data, the tunneling information including tunneling source address information having the network access information of the management device 400 corresponding to the transmission side in accordance with the particular network among the two or more networks through which the corresponding partial data passes and tunneling destination address information having the access information of the transmission/reception device 100 configured to receive at least one of the first partial data and the second partial data transmitted via the particular network.

For example, in a case of the first partial data among the first partial data and second partial data, the tunneling information removing unit 190 may perform decapsulation which removes the tunneling header including the tunneling source address information having the network access information (for example, the 3G IP of the management device 400) corresponding to the transmission side in accordance with the particular network (for example, the 3G network) through which the first partial data passes and the tunneling destination address information having the access information (for example, the 3G IP of the transmission/reception device 400) of the transmission/reception device 400 configured to receive the first partial data transmitted via the particular network (for example, 3G network).

Further, in a case of the second partial data among the first partial data and second partial data, the tunneling information removing unit 190 may perform decapsulation which removes the tunneling header including the tunneling source address information having the network access information (for example, the WiFi IP of the management device 400) corresponding to the transmission side in accordance with the particular network (for example, the WiFi network) through which the second partial data passes and the tunneling destination address information having the access information (for example, the WiFi IP of the transmission/reception device 400) of the transmission/reception device 400 configured to receive the second partial data transmitted via the particular network (for example, the WiFi network).

Accordingly, the tunneling information removing unit 190 can remove the tunneling header inserted into each of the first partial data and the second partial data.

That is, the tunneling information removing unit 190 can perform the decapsulation which removes the tunneling information included in the received first partial data and second partial data, that is, the tunneling header.

The data combination unit 165 is configured to combine the first partial data and the second partial data according to the particular network access information based on the network access information included in the first partial data and the second partial data to reconstruct (or generate) the original data.

That is, the data combination unit 165 reconstructs the original data by combining the first partial data and the second partial data according to the particular network access information based on the network access information (for example, the virtual IP) included in the first partial data and second partial data where the tunneling information is removed, based on the order information.

More specifically, the data combination unit 165 can combine the corresponding first partial data and second partial data divided from one data provided by one external device based on the order information included in each partial data, based on at least one access information of the network access information for identifying that the first partial data and second partial data are the partial data which are divided from one data included in the destination address information of the first partial data and second partial data where the tunneling information is removed and then transmitted to the transmission/reception device corresponding to the final recipient and the access information of the external device indicating that the first partial data and the second partial data are the data transmitted and provided from the particular external device included in the source address information of the first partial data and the second partial data.

That is, the data combination unit 165 identifies the network access information (for example, the virtual IP) included in the destination address information from the headers of the first partial data and second partial data where the tunneling information is removed, and extracts the first partial data and the second partial data having the particular network access information (for example, the virtual IP) used by the transmission/reception device 100 including itself, that is, the data division controller 110. It means that the first partial data and the second partial data are the partial data divided from one data provided to the transmission/reception device 100.

Further, the data combination unit 165 identifies the network access information included in the source address information from the headers of the first partial data and second partial data having the extracted particular network access information (for example, the virtual IP), and extracts the first partial data and the second partial data having the access information of the same particular external device 500 indicating that the first partial data and the second partial data are the data provided and transmitted from the particular external device 500. It means that the first partial data and the second partial data are the data provided from one external device 500.

Accordingly, the data combination unit 165 can reconstruct (or generate) the original data provided from the external device 500 corresponding to the initial originator by extracting/recognizing the corresponding first partial data and second partial data divided from one data provided from one external device 500 based on the destination address information and the source address information of the first partial data and second partial data where each tunneling information is removed and mixing/combining the first partial data and the second partial data according to the order information included in each partial data.

The data combination unit 165 can provide the reconstructed original data to the data interface unit 150, and the data interface unit 150 can transmit the corresponding data to the corresponding application using the data service through the current simultaneous transmission service.

As described above, the transmission/reception device according to the present disclosure can implement the efficient and highly reliable heterogeneous network based-simultaneous data transmission service by managing a plurality of division sessions divided from one session as one session by dividing data in transmitting/receiving data to/from the particular external device via the particular management device and transmitting/receiving the data by using a plurality of heterogeneous networks, and particularly, additionally applying the network access information (for example, the virtual IP) for implementing simultaneous link transmission through the plurality of heterogeneous networks in one session for data transmission/reception and tunneling information which allows the data to be transmitted via the particular network to the particular data.

Figure 4:
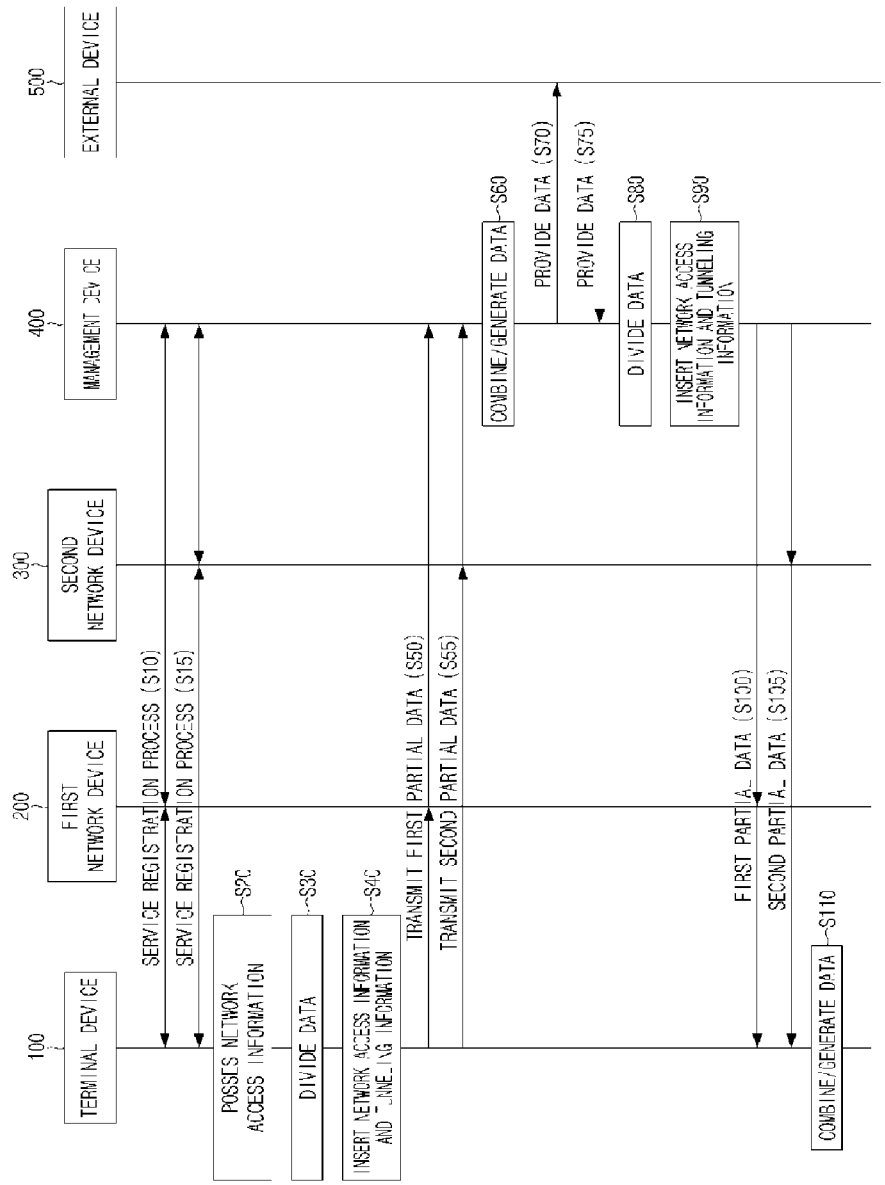
FIG. 4 is a flowchart of a service flow of a heterogeneous network-based simultaneous data transmission service method according to at least one embodiment of the present disclosure.
Figure 5:
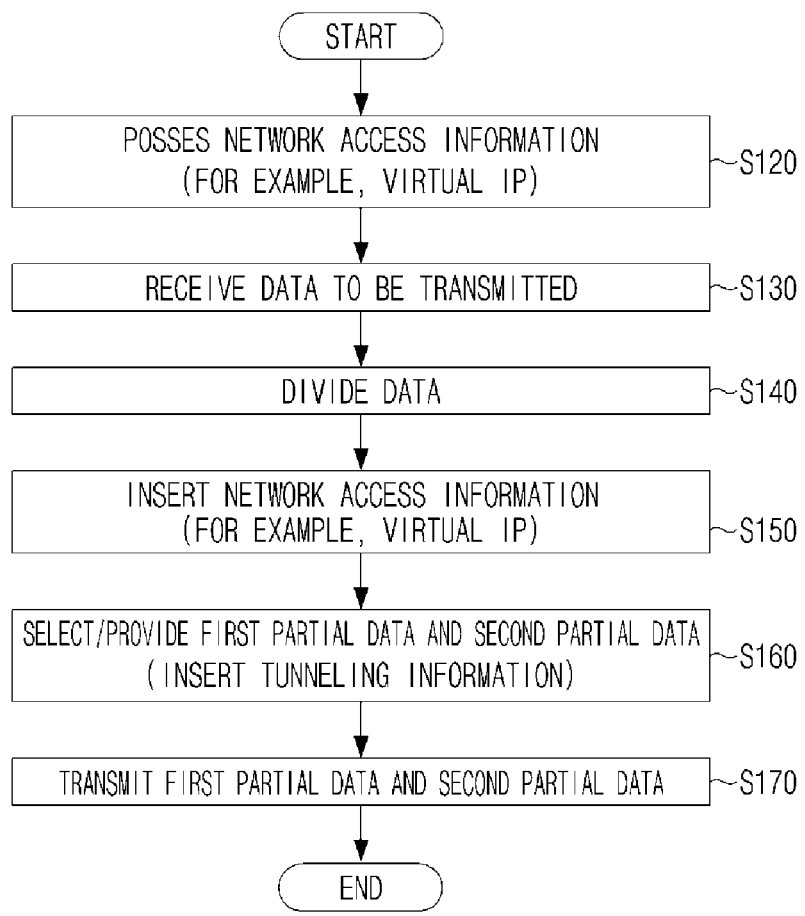
FIG. 5 is a flowchart of an operation flow of an uplink process in an operation method of a transmission and reception device according to at least one embodiment of the present disclosure.
Figure 6:
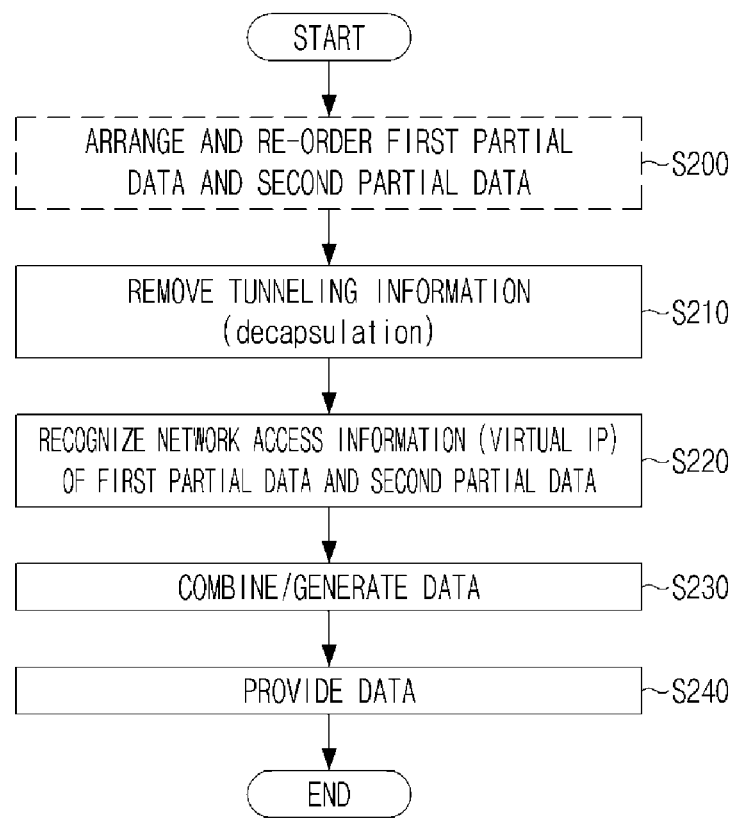
FIG. 6 is a flowchart of an operation flow of a downlink process in an operation method of a transmission and reception device according to at least one embodiment of the present disclosure.

Hereinafter, a heterogeneous network based-simultaneous data transmission method and an method according to at least one embodiment of the present disclosure will be described with referent to FIGS. 4 to 6. Here, for convenience of the descriptions, configurations the same as those illustrated in FIGS. 1 to 3 will be described by using the corresponding reference numerals.

First, an uplink process of the heterogeneous network based-simultaneous data transmission method according to some embodiments of the present disclosure will be described with reference to FIG. 4.

The terminal device 100 accesses the management device 400 through a heterogeneous network (for example, 3G and WiFi networks) to make a request for a service registration in steps S10 and S15.

Prior to the request, the terminal device 100 may receive allocation its own first network access information (for example, a 3G IP) for the 3G network and its own second network access information (for example, a WiFi IP) for the WiFi network.

For example, the terminal device 100 can receive allocation its own first network access information (for example, the 3G IP) from the first network device 200 according to a conventional access information allocation method by registering a position in the 3G network.

Further, the terminal device 100 can receive allocation its own second network access information (for example, the WiFi IP) from the second network device 300 according to a conventional access information allocation method by accessing the WiFi network.

Thereafter, for a service registration process between the terminal device 100 and the management device 400, the terminal device 100 acquires access information (for example, a management device 3G IP) of the management device 400 for the access to the 3G network by which the terminal device 100 can access the management device 400 through the first network, that is, the 3G network, and acquires access information (for example, a management device WiFi IP) of the management device 400 for the access to the WiFi network by which the terminal device 100 can access the management device 400 through the second network, that is, the WiFi network.

At this time, acquiring/recognizing, by the terminal device 100, the access information (for example, the management 3G IP) of the management device 400 for the access to the 3G network and the access information (for example, the management WiFi IP) of the management device 400 for the access to the WiFi network can be performed through various procedures.

Further, when the process of acquiring the access information of the management device 400 is completed, the service registration process between the terminal device 100 and the management device 400 is performed.

In this connection, the terminal device 100 accesses the management device 400 through the respective networks based on the acquired access information for the access to the 3G network and access information for the access to the WiFi network to make a request for the service registration.

For example, the terminal device 100 accesses the management device 400 through the first network, that is, the 3G network based on the acquired access information (for example, the management 3G IP) of the management device 400 for the access to the 3G network, and transmits a binding update message to make a request for registering the terminal device 100 itself. Then, the management device 400 performs the service registration of the terminal device 100 by identifying additional information contained in the service registration request, for example, device identification information (for example, IMSI), first network access information (for example, the 3G IP), network type information (for example, the 3G network) indicating a network type through which the binding update message is transmitted, and service classification information (initial, update, and remove), and transmits a binding update response message (binding update ack) to the terminal device 100, which corresponds to performance of the service registration process through the 3G network.

Further, the terminal device 100 accesses the management device 400 through the second network, that is, the WiFi network based on the acquired access information (for example, the management device WiFi IP) of the management device 400, and transmits a binding update message to make a request for registering the terminal device 100 itself. Then, the management device 400 performs the service registration of the terminal device 100 by identifying additional information contained in the service registration request, for example, device identification information (for example, IMSI), second network access information (for example, the WiFi IP), network type information (for example, the WiFi network) indicating a network type through which the binding update message is transmitted, and service classification information (initial, update, and remove), and transmits a binding update response message (binding update ack) to the terminal device 100, which corresponds to performance of the service registration process through the WiFi network.

At this time, the device terminal 100 can receive and possesses separate network access information (for example, a virtual IP) for the heterogeneous network-based simultaneous data transmission service according to the present disclosure, and the allocation may be managed by the management device 400.

Then, the terminal device 100 can receive the network access information (for example, the virtual IP) allocated by the management device 400 during the service registration process through the aforementioned 3G network or WiFi network and possess the received network access information in step S20.

Of course, various methods in which the terminal device 100 generates or possesses the network access information by itself based on pre-possessed device identification information (for example, MDN, IMSI, IMEI and the like) or uses/possesses pre-allocated network access information (for example, the 3G IP or WiFi IP) as the network access information can be used as well as the method of allocating/receiving the network access information (for example, the virtual IP) by/from the management device 400.

The uplink process will be first described. The terminal device 100 corresponding to the transmission/reception device according to present disclosure divides data to be transmitted into partial data to use the simultaneous transmission service in step S30.

That is, the terminal device 100 divides the data to be transmitted into two or more partial data corresponding to the number of networks for the simultaneous data transmission using the heterogeneous network environment, that is, the 3G network and the WiFi network, and the division process may be performed according to a traffic distribution rate for each of the changed networks received from the management device 400 according to a network selection policy transmitted from the policy management device 600 or real time network status monitoring.

In other words, the terminal device 100 identifies a first transmission rate for data transmission to the first network device 200 and a second transmission rate for data transmission to the second network device 300 included in the network selection policy, selects first partial data to be transmitted to the first network device 200 from two or more partial data divided from particular data to be transmitted, and selects second partial data to be transmitted to the second network device 300 from the remaining partial data based on the identified transmission rates.

Further, the terminal device 100 inserts particular network access information (for example, a virtual IP) and first tunneling information which induces first partial data to pass through at least one corresponding particular network (for example, the 3G network) among two or more networks (for example, 3G, WiFi, LTE, and WiBro networks and the like) into the first partial data, and inserts the particular network access information (for example, the virtual IP) and second tunneling information which induces second partial data to pass through at least one corresponding particular network (for example, the WiFi network) among two or more networks (for example, 3G, WiFi, LTE, and WiBro networks and the like) into the second partial data in step S40.

Thereafter, the terminal device 100 transmits the first partial data to the first network device 200 located in the 3G network based on the first tunneling information included in the first partial data, and the first network device 200 transmits the first partial data to the management device 400 corresponding to a reception device in step S50.

Further, the terminal device 100 transmits the second partial data to the second network device 300 located in the WiFi network based on the second tunneling information included in the second partial data, and the second network device 300 transmits the second partial data to the management device 400 corresponding to the reception device in step S55.

As described above, the first partial data divided by the terminal device 100 is transmitted to the management device 400 via the 3G network, and the second partial data divided by the terminal device 100 is transmitted to the management device 400 via the WiFi network.

The management device 400 receives the first partial data from the first network device 200 and the second partial data from the second network device 300, and reconstructs data by combining the first partial data and the second partial data according to particular network access information based on the network access information included in the received first partial data and second partial data in step S60 to reconstruct the data to be transmitted, which the terminal device 100 desires to transmit.

That is, the management device 400 can reconstruct (or generate) the original data to be transmitted by recognizing the first partial data and the second partial data having the same network access information (for example, the virtual IP) based on the network access information (for example, the virtual IP) included in the received several partial data and mixing/combining the first partial data and the second partial data according to order information included in the corresponding partial data.

Further, the management device 400 transmits the reconstructed data to be transmitted to the external device 500 by using access information of the external device corresponding to a final recipient recognized through at least one partial data among the first partial data and the second partial data in step S70.

As described above, the first partial data and the second partial data divided by the terminal device 100 are combined by the management device 400 during the process in which the first partial data and the second partial data pass through the management device 400 through the heterogeneous network (the 3G and WiFi networks) and reconstructed as the original data to be transmitted, and the reconstructed data to be transmitted is transferred to the external device 500 which is the final recipient as one data.

Next, a downlink process will be described. The management device 400 divides data which is requested in step S75 to be transmitted from the external device 500 to the terminal device 100 to partial data to use the simultaneous transmission service in step S80.

That is, the management device 400 divides the data to be transmitted into two or more partial data corresponding to the number of networks for the simultaneous data transmission using the heterogeneous network environment, that is, the 3G network and the WiFi network, and the division process may be performed according to the traffic distribution rate for each of the changed networks according to the network selection policy transmitted from the policy management device 600 and the real time network status monitoring.

In other words, the management device 400 identifies a first transmission rate for data transmission to the first network device 200 and a second transmission rate for data transmission to the second network device 300 included in the network selection policy, selects first partial data to be transmitted to the first network device 200 from two or more partial data divided from particular data to be transmitted, and selects second partial data to be transmitted to the second network device 300 from the remaining partial data based on the identified transmission rates.

Further, the management device 400 identifies access information for each network corresponding to the terminal device 100 which is a final recipient of the current data transmission and network access information based on table information for each subscriber pre-managed by the management device 400. For example, the management device 400 can identify the first network access information and the second network access information (for example, the 3G IP and the WiFi IP) corresponding to the terminal device 100 and the network access information (for example, the virtual IP) based on the table information for each subscriber.

In addition, the management device 400 inserts particular network access information (for example, the virtual IP) and first tunneling information which induces first partial data to pass through at least one particular network (for example, the 3G network) among two or more networks (for example, 3G, WiFi, LTE, and WiBro networks and the like) into the first partial data, and inserts the particular network access information (for example, the virtual IP) and second tunneling information which induces second partial data to pass through at least one particular network (for example, the WiFi network) among two or more networks (for example, 3G, WiFi, LTE, and WiBro networks and the like) into the second partial data in step S90.

Thereafter, the management device 400 transmits the first partial data to the first network device 200 located in the 3G network based on the first tunneling information included in the first partial data, and the first network device 200 transmits the first partial data to the terminal device 100 which is the reception device in step S100.

Further, the management device 400 transmits the second partial data to the second network device 300 located in the WiFi network based on the second tunneling information included in the second partial data, and the second network device 300 transmits the second partial data to the terminal device 100 which is the reception device in step S105.

As described above, the data transmitted from the external device 500 is divided during the process where the data passes through the management device 400, and the first partial data divided by the management device 400 is transmitted to the terminal device 100 via the 3G network and the second data divided by the management device 400 is transmitted to the terminal device 100 via the WiFi network.

The terminal device 100 receives the first partial data from the first network device 200 and the second partial data from the second network device 300, and reconstructs the data to be transmitted, which the management device 400 desires to transmit, by combining the first partial data and the second partial data according to particular network access information based on the network access information included in the received first partial data and second partial data to reconstruct (or generate) the data.

That is, the terminal device 100 can reconstruct (or generate) the original data to be transmitted by recognizing the first partial data and the second partial data having pre-allocated network access information (for example, the virtual IP) based on the network access information (for example, the virtual IP) included in the received several partial data, recognizing the first partial data and the second partial data from the same external device 500 by identifying access information corresponding to an initial originator, that is, access information of the external device 500, and mixing/combining the first partial data and the second partial data according to the order information included in the corresponding partial data.

As described above, the first partial data and the second partial data divided by the management device 400 are transmitted to the terminal device 100 via the heterogeneous network (the 3G and WiFi networks), combined by the terminal device 100, and then reconstructed as the original data to be transmitted.

Hereinafter, particularly, the uplink process in the method according to the present disclosure will be described with reference to FIG. 5.

In the method according to the present disclosure, separate network access information (for example, the virtual IP) is possessed for the heterogeneous network based-simultaneous data transmission service according to the present disclosure in step S120.

For example, in the method according to the present disclosure, a service registration is requested to the management device 400 through at least one of the first network and the second network, and the network access information recognized through a response transmitted in response to the request can be possessed.

That is, as described above, in the method according to the present disclosure, a binding update message of making a request for the service registration is transmitted to the management device 400 through the heterogeneous network (for example, the 3G network or the WiFi network), the network access information (for example, the virtual IP) included in a binding update response message is acquired/recognized during a service registration process in which the binding update response message is received in response to the request, and the acquired/recognized network access information is possessed. In this case, since the management device 400 allocates the network access information (for example, the virtual IP), the management device 400 can perform the management while reflecting the allocated network access information (for example, the virtual IP) at this time to table information for each subscriber.

Meanwhile, in the method according to the present disclosure, in addition to the method of allocating/receiving the network access information by/from the management device 400, the network access information may be generated and possessed based on device identification information (for example, MDN, IMSI, IMEI and the like) pre-possessed according to a pre-defined particular access information generating policy, or one of the pre-allocated first network access information (for example, the 3G IP) and second network access information (for example, the WiFi IP) may be possessed as the network access information. In this case, in the method according to the present disclosure, the network access information (for example, the virtual IP) is provided to the management device 400, so that the management device 400 can perform the management while reflecting the current network access information (for example, the virtual IP) to table information for each subscriber as described above.

In the method according to the present disclosure, transmission of particular data to be transmitted may be requested through reception of the particular data from a particular application using an executed data service in step S130.

In the method according to the present disclosure, one data to be transmitted is divided into two or more partial data in step S140

More specifically, in the method according to the present disclosure, the data to be transmitted is divided into two or more partial data corresponding to the number of networks to simultaneously transmit the data by using the 3G network and the WiFi network, and the division process may be performed according to a traffic distribution rate for each of the changed networks received from the management device 400 according to a network selection policy transmitted from the policy management device 600 and real time network status monitoring.

Further, in the method according to the present disclosure, particular network access information is inserted into the two or more partial data in step S150.

That is, as described above, in the method according to the present disclosure, separate network access information (for example, the virtual IP) is allocated and possessed for the heterogeneous network-based simultaneous data transmission service.

Accordingly, in the method according to the present disclosure, pre-possessed network access information (for example, the virtual IP) may be inserted into each of the two or more divided partial data.

In the method according to the present disclosure, a header including the network access information (for example, the virtual IP) for identifying that the first partial data and the second partial data are the partial data divided from one data provided from the transmission/reception device 100 as source address information and including the access information of the particular external device 500 corresponding to the final recipient receiving the particular data as destination address information may be inserted into the two or more partial data including the first partial data and the second partial data.

Further, in the method according to the present disclosure, a first transmission rate for data transmission to the first network device 200 and a second transmission rate for data transmission to the second network device 300 included in the network selection policy are identified, the first partial data to be transmitted to the first network device 200 is selected from the two or more partial data divided as described above, and the second partial data to be transmitted to the second network device 300 is selected from the remaining partial data based on the identified transmission rates.

Accordingly, in the method according to the present disclosure, by performing the data division/distribution process based on the network selection policy and each of the traffic distribution rates changed in real time, relative usage rates of the 3G network and the WiFi network, for example, 10% of the 3G network and 90% of the WiFi network, 90% of the 3G network and 10% of the WiFi network, 50% of the 3G network and 50% of the WiFi network, 0% of the 3G network and 100% of the WiFi network, and 100% of the 3G network and 0% of the WiFi network may be applied.

Further, in the method according to the present disclosure, tunneling information which induces data to pass through at least one corresponding particular network (for example, the WiFi network) among the two or more networks (for example, 3G, WiFi, LTE, and WiBro networks and the like) is inserted into the first partial data corresponding to a part of the two or more partial data and the second partial data corresponding to another part of the two or more partial data including the network access information in step S160.

More specifically, in the method according to the present disclosure, the first tunneling information which induces the first partial data to pass through the particular network (for example, the 3G network) among the two or more networks is inserted into the first partial data and the second tunneling information which induces the second partial data to pass through the particular network (for example, the WiFi network) among the two or more networks is inserted into the second partial data in step S160.

For example, in the method according to the present disclosure, encapsulation which inserts the first tunneling information having pre-allocated first network access information (for example, a 3G IP of the transmission/reception device 100) as tunneling source address information in accordance with the particular first network (for example, the 3G network) to be passed through among the two or more networks and having access information (for example, a 3G IP of the management device) of the particular management device 400 configured to receive the first partial data transmitted via the particular first network device 200 located in the first network (for example, the 3G network) as tunneling destination address information into the first partial data as a tunneling header may be performed.

Further, in the method according to the present disclosure, encapsulation which inserts the second tunneling information having pre-allocated second network access information (for example, a WiFi IP of the transmission/reception device 100) as tunneling source address information in accordance with the particular second network (for example, the WiFi network) to be passed through among the two or more networks and having access information (for example, a WiFi IP of the management device) of the particular management device 400 configured to receive the second partial data transmitted via the particular second network device 300 located in the second network (for example, the 3G network) as tunneling destination address information into the second partial data as a tunneling header may be performed.

Meanwhile, in the method according to the present disclosure, the tunneling information data may be inserted into the first partial data and the second partial by providing the first partial data to the corresponding communication module (for example, the first communication unit 132 of FIG. 2) for the pre-corresponded first network (for example, the 3G network) and providing the second partial data to the corresponding communication module (for example, the second communication unit 136 of FIG. 2) for the pre-corresponded second network (for example, the WiFi network) in step S160.

According to a tunneling procedure by the first communication unit 132 and the second communication unit 136, the first tunneling information included in the first partial data may include first network access information (for example, a 3G IP) pre-allocated to the terminal device 100 in accordance with the particular first network (for example, the 3G network) which is desired to be passed through among two or more networks (for example, 3G, WiFi, LTE, and WiBro networks and the like) as tunneling source address information and access information (for example, a 3G IP of the management device 400) of the particular management device 400 configured to receive the first partial data transmitted via the particular first network device 200 located in the first network (for example, the 3G network) as tunneling destination address information. At this time, it is preferable that the first tunneling information included in the first partial data is inserted or capsulated into the first partial data as a tunneling header.

Further, the second tunneling information included in the second partial data may include second network access information (for example, a WiFi IP) pre-allocated to the transmission/reception device 100 in accordance with the particular second network (for example, the WiFi network) which is desired to be passed through among two or more networks (for example, 3G, WiFi, LTE, and WiBro networks and the like) as tunneling source address information and access information (for example, a WiFi IP of the management device 400) of the particular management device 400 configured to receive the second partial data transmitted via the particular second network device 300 located in the second network (for example, the WiFi network) as tunneling destination address information. At this time, it is preferable that the second tunneling information included in the second partial data is inserted or capsulated into the second partial data as a tunneling header.

The network access information for identifying that the first partial data and the second partial data are the partial data divided from one data provided from the particular transmission/reception device, that is, the transmission/reception device 100 is carried on the first partial data and the second partial data, and the tunneling information which allows the data to arrive/be transmitted to the management device 400 via the particular network is also carried on the first partial data and the second partial data.

Further, in the o method device according to the present disclosure, the first partial data and the second partial data are transmitted through corresponding networks in step S170.

That is, in the method according to the present disclosure, the first partial data is transmitted to the first network device 200 by using the 3G network based on the first tunneling information included in the first partial data, and the second partial data is transmitted to the second network device 300 by using the WiFi network based on the second tunneling information included in the second partial data.

The first partial data is transmitted to the management device 400 via the first network device 200 by using the 3G network based on the first tunneling information included in the first partial data, and the second partial data is transmitted to the management device 400 via the second network device 300 by using the WiFi network based on the second tunneling information included in the second partial data.

Meanwhile, the downlink process in the operation method of the terminal device according to the present disclosure will be described with reference to FIG. 6.

In the method according to the present disclosure, the original data to be transmitted can be reconstructed (or generated) by receiving and combining the partial data according to the simultaneous transmission service.

In the method according to the present disclosure, first partial data corresponding to a part of the two or more partial data divided from one particular data and second partial data corresponding to another part of the two or more partial data are received.

That is, in the method according to the present disclosure, the first partial data transmitted via the first network device 200 located in the 3G network is received and the second partial data transmitted via the second network device 300 located in the WiFi network is received through a transmission path according to access information included in the tunneling headers of the first partial data and the second partial data.

At this time, in the method according to the present disclosure, it is preferable that the first partial data and the second partial data according to a reception order are reordered based on order information included in each partial data in step S200.

In the method according to the present disclosure, the tunneling information included in the received first partial data and second partial data is removed in step S210.

That is, in the method according to the present disclosure, decapsulation which removes the tunneling information included in the received first partial data and second partial data, that is, the tunneling header may be performed.

In the method according to the present disclosure, from the received first partial data and second partial data, the tunneling information including tunneling source address information having the network access information of the management device 400 corresponding to the transmission side in accordance with the particular networks among the two or more networks through which the corresponding partial data passes and tunneling destination address information having the access information of the transmission/reception device 100 configured to receive at least one of the first partial data and the second partial data transmitted through the particular networks is removed.

For example, in the method according to the present disclosure, in a case of the first partial data among the first partial data and second partial data, decapsulation which removes the tunneling header including the tunneling source address information having the network access information (for example, the 3G IP of the management device 400) corresponding to the transmission side in accordance with the particular network (for example, the 3G network) through which the first partial data passes and the tunneling destination address information having the access information (for example, the 3G IP of the transmission/reception device 400) of the transmission/reception device 400 configured to receive the first partial data transmitted via the particular network (for example, the 3G network) is performed.

Further, in the method according to the present disclosure, in a case of the second partial data among the first partial data and second partial data, decapsulation which removes the tunneling header including the tunneling source address information having the network access information (for example, the WiFi IP of the management device 400) corresponding to the transmission side in accordance with the particular network (for example, the WiFi network) through which the second partial data passes and the tunneling destination address information having the access information (for example, the WiFi IP of the transmission/reception device 400) configured to receive the second partial data transmitted via the particular network (for example, the WiFi network) is performed.

In the method according to the present disclosure, the tunneling header inserted into each of the first partial data and second partial data can be removed.

Further, in the method according to the present disclosure, the original data can be reconstructed by combining the first partial data and the second partial data according to the particular network access information based on the network access information included in the first partial data and the second partial data.

More specifically, in the method according to the present disclosure, the corresponding first partial data and second partial data divided from one data provided by one external device can be combined based on the order information included in each partial data, based on at least one access information of the network access information for identifying that the first partial data and second partial data are the partial data which are divided from one data included in the destination address information of the first partial data and second partial data and then transmitted to the transmission/reception device corresponding to the final recipient and the access information of the external device indicating that the first partial data and the second partial data are the data transmitted and provided from the particular external device included in the source address information of the first partial data and the second partial data.

That is, in the method according to the present disclosure, the network access information (for example, the virtual IP) included in the destination address information is identified from the headers of the first partial data and second partial data where the tunneling information is removed and the first partial data and the second partial data having the particular network access information (for example, the virtual IP) used by the terminal device 100 including itself are extracted in step S220. It means that the first partial data and the second partial data are the partial data divided from one data provided to the transmission/reception device 100.

Further, in the method according to the present disclosure, the network access information included in the source address information is identified from the headers of the first partial data and second partial data having the extracted particular network access information (for example, the virtual IP) and the first partial data and the second partial data having the particular network access information of the same particular external device 500 indicating that the first partial data and the second partial data are the data transmitted and provided from the particular external device 500 are extracted. It means that the first partial data and the second partial data are the partial data provided from one external device 500.

In the method according to the present disclosure, the original data provided from the external device 500 corresponding to the initial originator can be reconstructed by extracting and recognizing the corresponding first partial data and second partial data divided from one data provided from on external device 500 based on the destination address information and the source address information of the first partial data and second partial data where the tunneling information is removed and mixing and/or combining the first partial data and the second partial data according to the order information included in each partial data in step S230.

Further, in the method according to the present disclosure, the reconstructed original data can be provided to the corresponding application using the data service through the current simultaneous transmission service in step S240.

As described above, the operation method of the transmission device and reception device according to the present disclosure can implement the efficient and highly reliable heterogeneous network based-simultaneous data transmission service by managing a plurality of division sessions divided from one session as one session by dividing data in transmitting/receiving data to/from the particular external device via the particular management device and transmitting/receiving the data by using a plurality of heterogeneous networks, and particularly, additionally applying the network access information (for example, the virtual IP) for implementing simultaneous link transmission through the plurality of heterogeneous networks in one session for data transmission/reception and tunneling information which allows the data to be transmitted via the particular network to the particular data.

According to a transmission device and a reception device and an method according to the present disclosure, it is possible to manage a plurality of sessions divided from one session as one session and implement an efficient and highly reliable heterogeneous network based-simultaneous data transmission service by dividing data and transmitting/receiving the divided data by using a plurality of heterogeneous networks in data transmission/reception with a particular external device through a particular management device and more particularly additionally applying network access information (for example, a virtual IP) and tunneling information which allows the data to be transmitted via a particular network to partial data to achieve simultaneous link transmission through the plurality of heterogeneous networks during or within a single data session.

Meanwhile, the methods or steps of the algorithm described related to the at least one embodiment of the present disclosure may be directly realized in the form of hardware, software executed by a processor, or a combination thereof. The software module may reside in a storage medium, such as a RAM memory, a flash memory, a ROM memory, an EPROM memory, an EEPROM memory, registers, a hard disc, a mobile disc, a CD-ROM, or other storage devices generally known in the art. The storage medium is connected to the processor, so that the processor may read information from the storage medium or record the information onto the storage medium. Alternatively, the storage medium can be integrated in the processor. The processor and the storage medium may be included in an application specific integrated circuits (ASIC). The ASIC may be included in one or more of the transmission device, the first and second network devices, the management device, the policy management device, the external device and other hardware elements in the heterogeneous network(s). Alternatively, the processor and the storage medium may serve as components of one or more of the transmission device, the reception device, the first and second network devices, the management device, the policy management device, the external device and other hardware elements in the heterogeneous network(s).

Some embodiments as described above may be implemented in the form of one or more program commands that can be read and executed by a variety of computer systems and be recorded in any non-transitory, computer-readable recording medium. The computer-readable recording medium may include a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device may be configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality Although the various embodiments of the present disclosure have been described, it is understood that the present disclosure should not be limited to these embodiments but various changes and modifications can be made by one ordinarily skilled in the art within the subject matter, the spirit and scope of the present disclosure as hereinafter claimed. Specific terms used in this disclosure and drawings are used for illustrative purposes and not to be considered as limitations of the present disclosure.

What is claimed is:

1. A transmission device for simultaneous data transmission, the device comprising:
a multi communication unit including two or more network interfaces configured to communicate with corresponding two or more networks in a heterogeneous network; and
a controller configured to
divide particular data to be transmitted into two or more partial data, generate one or more tunneling information to allow partial data among the two or more partial data to be transmitted through a particular network among the two or more networks in the heterogeneous network during a single data session, by (i) inserting first tunneling information into first partial data of the divided two or more partial data, the first tunneling information indicating information to cause the first partial data to pass through a first network of the two or more networks, and (ii) inserting second tunneling information into second partial data of the two or more partial data, the second tunneling information indicating information to cause the second partial data to pass through a second network of the two or more networks, and provide the first partial data and the second partial data to the multi communication unit, wherein the first partial data includes first access information indicating a destination address of a first terminal device to communicate through the first network, and the second partial data includes second access information indicating a destination address of a second terminal device to communicate through the second network.

2. The transmission device of claim 1, wherein the controller is configured to insert network access information of the transmission device into at least one of the two or more partial data as source address information and insert access information of an external device for receiving the particular data into at least one of the two or more partial data as destination address information.

3. The transmission device of claim 1, wherein the first tunneling information includes at least one of tunneling source address information and tunneling destination address information, and wherein the tunneling source address information is first network access information corresponding to the first network of the transmission device and the tunneling destination address information is access information corresponding to the first network of a management device configured to receive the divided two or more partial data of the particular data.

4. The transmission device of claim 1, wherein the second tunneling information includes at least one of tunneling source address information and tunneling destination address information, and wherein the tunneling source address information is second network access information corresponding to the second network of the transmission device and the tunneling destination address information is access information corresponding to the second network of a management device configured to receive the divided two or more partial data of the particular data.

5. The transmission device of claim 1, wherein the controller further comprises:

a data division controller configured to divide the particular data to be transmitted into the two or more partial data and insert network access information into the two or more partial data;

a data distribution controller configured to distribute the two or more partial data to the first partial data to be transmitted over the first network and the second partial data to be transmitted over the second network;

a first tunneling unit configured to insert the first tunneling information into the first partial data; and a second tunneling unit configured to insert the second tunneling information into the second partial data.

6. The transmission device of claim 1, wherein the controller further comprises a data ordering unit configured to reorder the first partial data and the second partial data based on order information included in each of the first and second partial data;

a decapsulation unit configured to remove tunneling information included in the reordered first partial data and second partial data; and a data combination controller configured to combine the reordered first partial data and second partial data, after removing the tunneling information, according to network access information included in the first partial data and the second partial data.

7. A reception device for simultaneous data transmission, comprising:

a multi communication unit including two or more network interfaces configured to communicate with corresponding two or more networks in a heterogeneous network; and a controller configured to receive through the multi communication unit first partial data corresponding to a part of two or more partial data through a first network of the two or more networks, the two or more partial data divided from particular data and transmitted from a transmission device, receive through the multi communication unit second partial data corresponding to another part of the two or more partial data through a second network of the two or more networks, remove first tunneling information included in the first partial data and second tunneling information included in the second partial data, and combine the first partial data and the second partial data after removing the first tunneling information and the second tunneling information to reconstruct the particular data, wherein at least one of the first tunneling information and the second tunneling information is generated at the transmission device to allow the particular data among the two or more partial data to be transmitted through a particular network among the two or more networks in the heterogeneous network during a single data session, by (i) inserting the first tunneling information into the first partial data of the divided two or more partial data, the first tunneling information indicating information to cause the first partial data to pass through the first network of the two or more networks, and (ii) inserting the second tunneling information into the second partial data of the two or more partial data, the second tunneling information indicating information to cause the second partial data to pass through the second network of the two or more networks, wherein the first partial data includes first access information indicating a destination address of a first terminal device to communicate through the first network, and the second partial data includes second access information indicating a destination address of a second terminal device to communicate through the second network.

8. The reception device of claim 7, wherein the first tunneling information included in the first partial data includes at least one of
- first network access information corresponding to the first network of the transmission device as tunneling source address information, and
- access information corresponding to the first network of a management device configured to receive the particular data as tunneling destination address information.

9. The reception device of claim 7, wherein the second tunneling information included in the second partial data includes at least one of
- second network access information corresponding to the second network of the transmission device as tunneling source address information, and
- access information corresponding to the second network of a management device as tunneling destination address information.

10. The reception device of claim 7, wherein the controller is configured to
- combine the first partial data and the second partial data by identifying that at least one of tunneling source address information and tunneling destination address information of the first tunneling information included in the first partial data is matched with at least one of tunneling source address information and tunneling destination address information of the second tunneling information included in the second partial data.

11. A method of providing simultaneous data transmission service over two or more networks in a heterogeneous network, the method comprising:
- dividing, by a transmission device, particular data to be transmitted into two or more partial data; and
- generating one or more tunneling information to allow partial data among the two or more partial data to be transmitted through a particular network among the two or more networks in the heterogeneous network during a single data session, by
    - (i) inserting, by the transmission device, first tunneling information into first partial data of the two or more partial data and transmitting the first partial data over a first network of the two or more networks, the first tunneling information indicating information to cause the first partial data to pass through the first network,
    - (ii) inserting, by the transmission device, second tunneling information into second partial data of the two or more partial data and transmitting the second partial data over a second network of the two or more networks, the second tunneling information indicating information to cause the second partial data to pass through the second network,
- wherein the first partial data includes first access information indicating a destination address of a first terminal device to communicate through the first network, and
- the second partial data includes second access information indicating a destination address of a second terminal device to communicate through the second network.

12. The method of claim 11, wherein the first tunneling information includes at least one of tunneling source address information and tunneling destination address information, wherein the tunneling source address information is first network access information corresponding to the first network of the transmission device and the tunneling destination address information is access information corresponding to the first network of a management device configured to receive the divided two or more partial data of the particular data.

13. The method of claim 11, wherein the second tunneling information includes at least one of tunneling source address information and tunneling destination address information,
- wherein the tunneling source address information is second network access information corresponding to the second network of the transmission device and the tunneling destination address information is access information corresponding to the second network of a management device configured to receive the divided two or more partial data of the particular data.

14. The method of claim 11, further comprising:
- receiving, by a reception device, the first partial data corresponding to a part of the two or more partial data divided from the particular data from the transmission device over the first network of the two or more networks;
- receiving, by the reception device, the second partial data corresponding to another part of the two or more partial data over the second network of the two or more networks; and
- removing, by the reception device, the first tunneling information included in the first partial data and the second tunneling information included in the second partial data; and
- combining, by the reception device, the first partial data and the second partial data after removing the first and second tunneling information to reconstruct the particular data.

15. The method of claim 14, wherein the first tunneling information includes at least one of
- first network access information corresponding to the first network of the transmission device as tunneling source address information and
- access information corresponding to the first network of a management device configured to receive the particular data as tunneling destination address information.

16. The method of claim 14, wherein the second tunneling information includes at least one of
- second network access information corresponding to the second network of the transmission device as tunneling source address information and
- access information corresponding to the second network of a management device as tunneling destination address information.

17. The method of claim 14, wherein the combining of the first partial data and the second partial data comprises
- combining the first partial data and the second partial data by identifying that at least one of tunneling source address information and tunneling destination address information of the first tunneling information included in the first partial data is matched with at least one of tunneling source address information and tunneling destination address information of the second tunneling information included in the second partial data.

* * * * *